Figure 1:
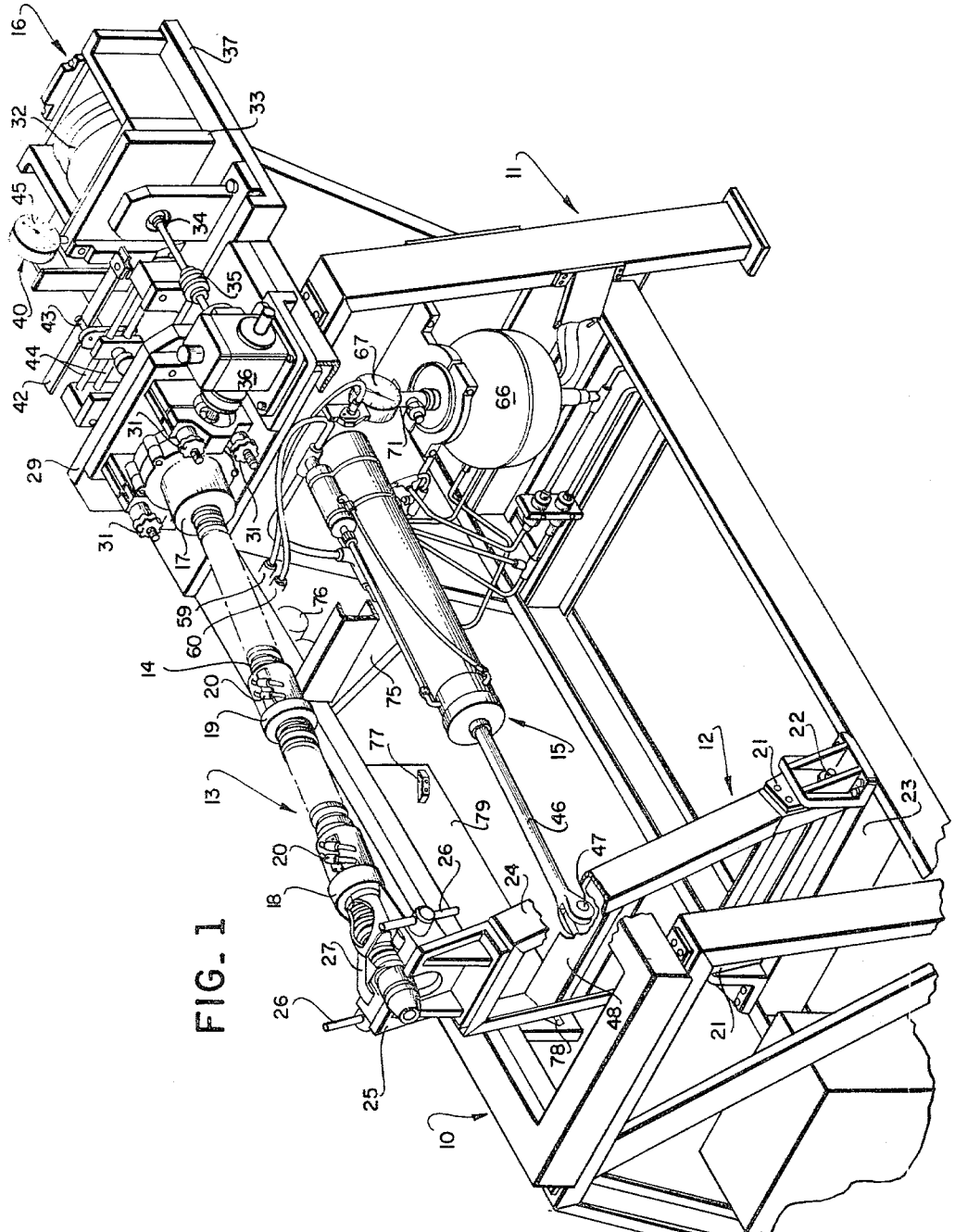

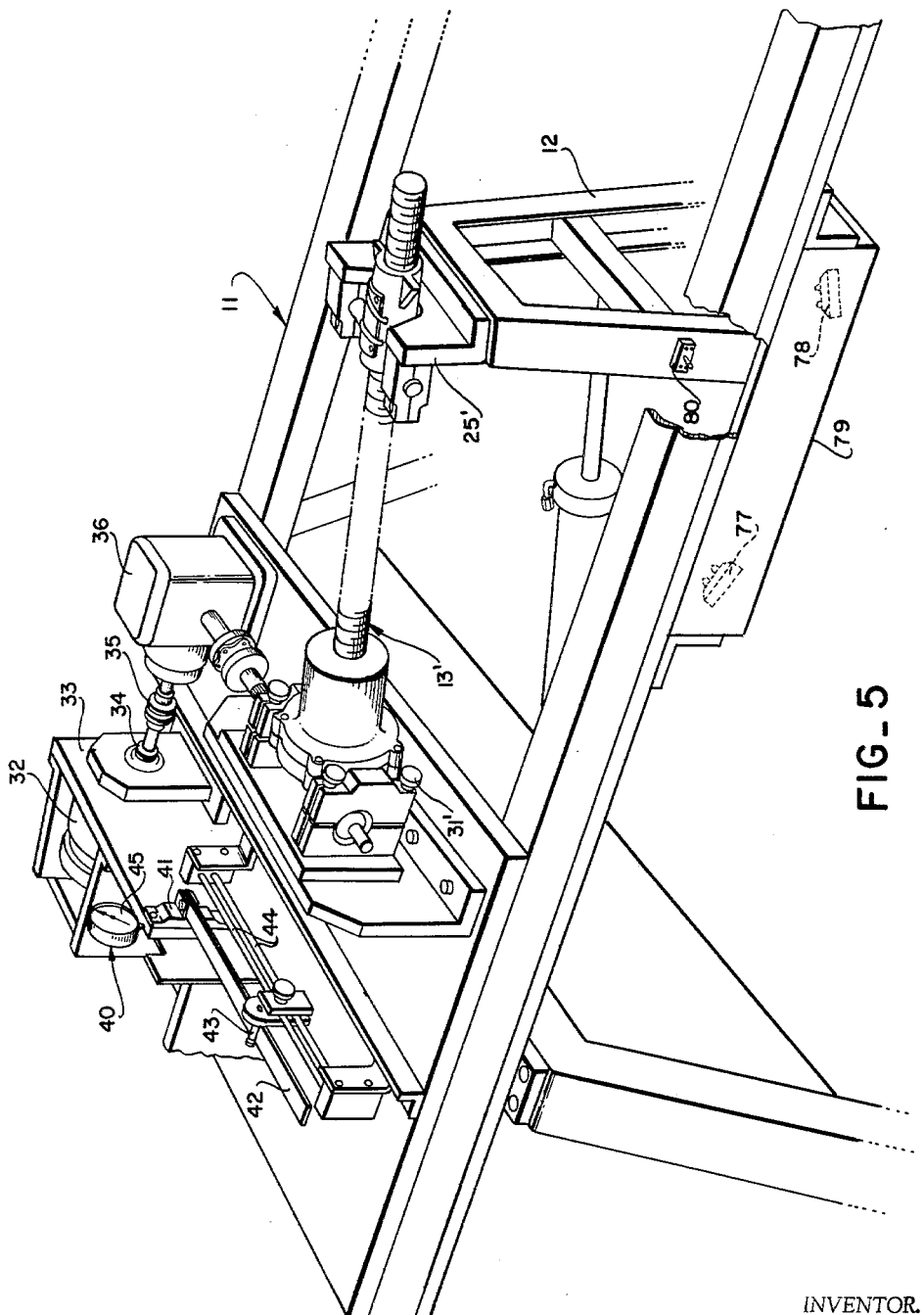

United States Patent Office 3,229,510
Patented Jan. 18, 1966

3,229,510
TESTING APPARATUS FOR BALL SCREWS AND BALL-DRIVEN ACTUATORS
Dirk Bodemeijer, Northridge, Calif., assignor to Lockheed Aircraft Corporation, Burbank, Calif.
Filed Nov. 23, 1962, Ser. No. 239,701
14 Claims. (Cl. 73—88)

This invention pertains to a testing apparatus and more particularly to an apparatus for testing actuators having ball screws and is more specifically designed to supply the users of ball screws and ball-driven actuators with a practical tool for checking the ball screws and ball-driven actuators during the service life or after overhaul thereof.

In many applications of actuators, particularly as used in actuating wing flaps and other movable portions of an aircraft, singular or telescopic ball screw actuators are used to move wing flaps, and the like, of the aircraft which are subjected to variable loads during their actuation. It has been found, contrary to prior opinion, that ball screws tend to last longer and wear less if the screw is impregnated with a lubricant instead of being coated with a relatively heavy coating of oil or grease which, during its usage, accumulates a great amount of dirt and grit which is worked into the ball by the screw and causes excessive wear thereto. The steel balls, climb on the deflectors and into transfer tubes, carrying accumulated grit and dirt, causing undue wear between the balls, the deflectors, the transfer tubes and the screw itself. As a matter of fact, the wear is so excessive that the ball screw actuator must be periodically checked and/or overhauled to keep the actuator in acceptable, usable and safe condition.

Previously, apparatus intended to accomplish generally similar purposes have been relatively large and impractical to ship from one overhaul station to another. They have also been inaccurate in facilitating evaluation of the condition of the actuators, or even the assembly thereof. The inevitable result has been a large percentage of rejections.

This invention, on the other hand, provide a new and improved testing device which is useful for checking out telescopic or similar type actuators. By being fitted with replaceable adapters it is appropriate for checking ball screws and actuators used in various modern-day aircraft. It incorporates a relatively compact structure, resembling a table, and can be used to check ball screws and actuators having a range of travel heretofore impracticable to test by equipment of comparable size.

The testing device includes a pair of frames of relatively rigid and sturdy construction able to withstand maximum operating loads without distortions in order to allow more accurate measurements of torque and ball screw efficiency, one frame being movable relative to the other.

An object of this invention is to provide a new and improved testing apparatus in which the testing of the actuator units to be checked requires little effort and operation on the screw during the tests and in which any defects or faults can be easily and readily detected.

Associated with the testing apparatus of this invention, is a means for mounting an actuator to the frames so as to extend and retract its screw and means for subjecting the actuator to a predetermined load during extension and retraction of its screw; and means for inspecting and evaluating the condition of the actuator while it is being subjected to the loads.

The means for indicating the condition of the apparatus being tested during extension and retraction sequences and, while under loads, includes an indicator having means for timing such extensions and retractions. Timer readings provide comparisons for known corresponding times required to normally extend and retract the actuator under comparable loads when in normal, acceptable operative condition, thereby indicating the existence of any faulty condition. A multiscope, similar to a stethoscope used by doctors, can be used, when applied to selective portions of the loaded actuator being tested. Sounds produced within the portions are thereby amplified and can be easily and readily detected and analyzed by an operator to locate defects and to prevent further damage being caused to the unit.

Yet another object of this invention is to provide a new and improved apparatus of the character described, in which both the actuator and a cylinder applying a load to the actuator are mounted in such manner at both their ends so that no bending loads are induced and the friction loads thereof are kept to a minimum.

Yet another object of this invention is to provide a new and improved load applying means which includes self-aligning bearings to preclude any possible misalignment.

Another object of this invention is to further provide a new and improved drive means for driving the actuator to extend and retract its screw and means for testing the output torque and speed of the drive means so as to be a factor in determining the reading of retraction and extension times of the screw relative to the actuator.

Another object of this invention is to mount the driving means in a torque housing to allow measuring of the output torque of the motor means.

This invention further provides a unique type of torque measuring device which is easily adjusted to obtain deflections under different loads falling within the limitations of the torque indicator, the torque indicator being readable on a standard dial indicator to allow a check of the drive motor output before an actuator is tested and to detect any high friction points during testing of the ball screw actuator, such high friction points being possibly caused by damage to the screw spindle, ball nut, or deflector and also considered a function of the wear of these parts.

A general object of this invention is to provide a new and improved testing apparatus for ball screws and ball screw actuators, and the like, which overcomes disadvantages of prior means and methods heretofore intended to accomplish generally similar purposes.

These and other objects of this invention will be more apparent from the following drawings, detailed description and appended claims.

Figure 2:
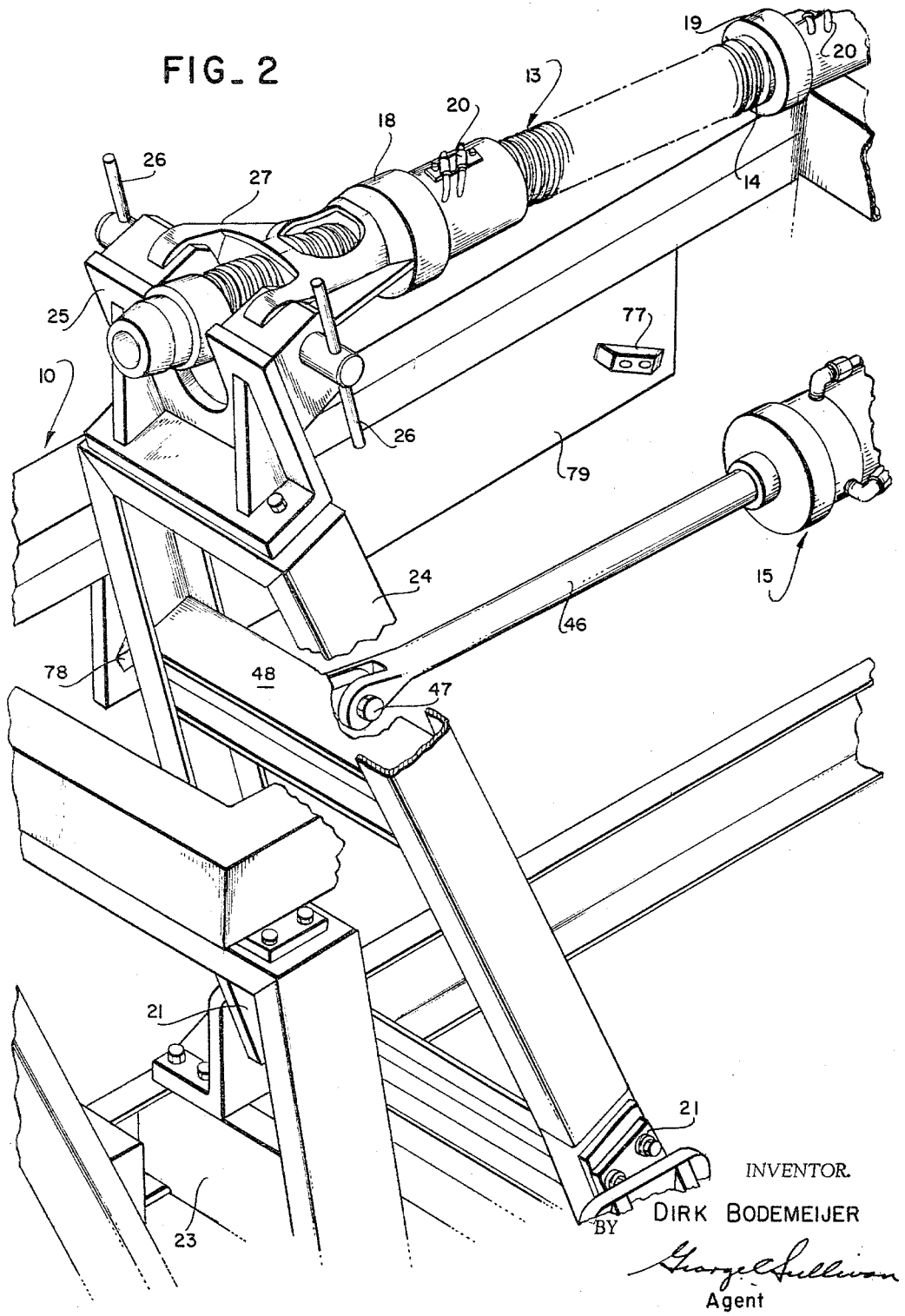
Figure 3:
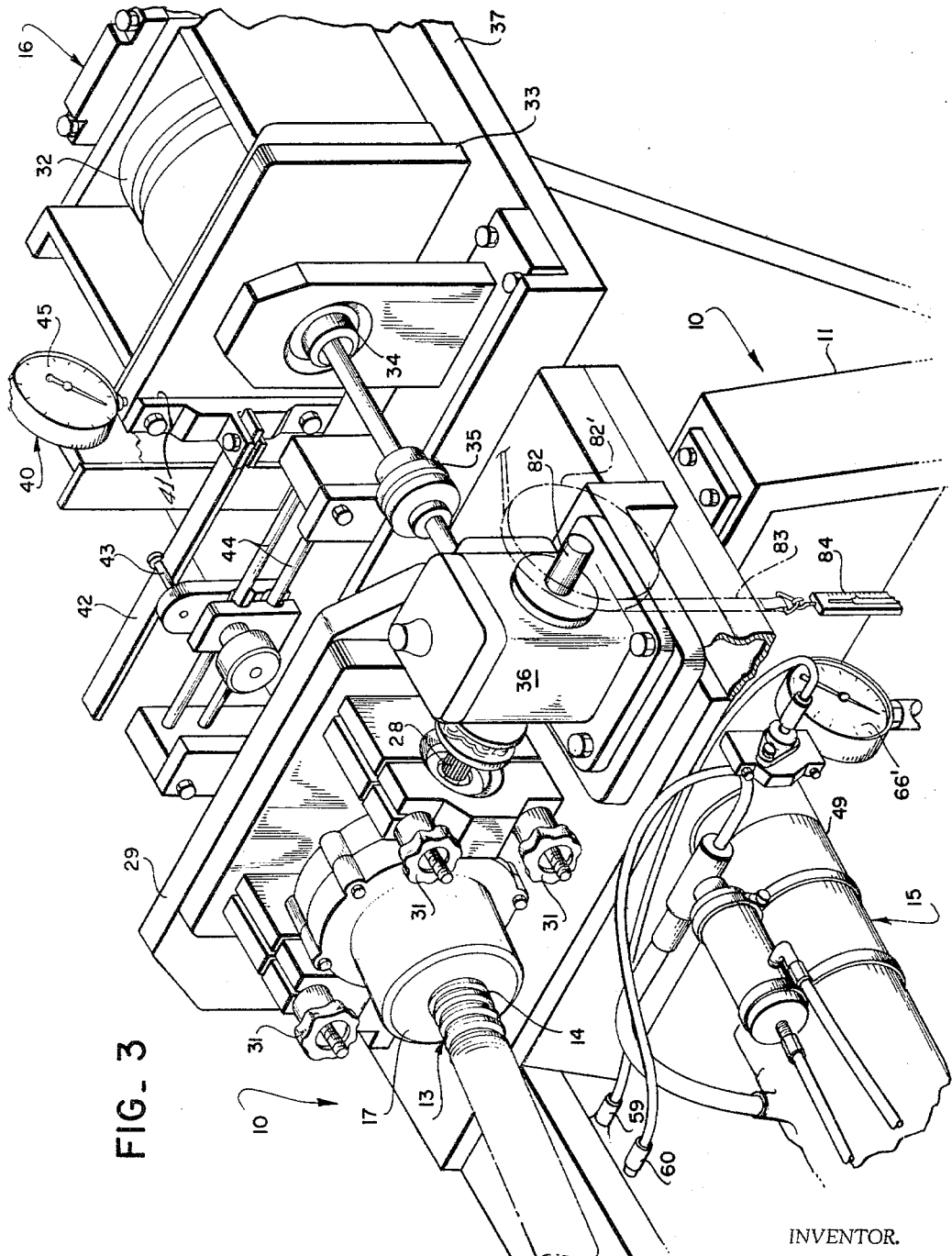
Figure 4:
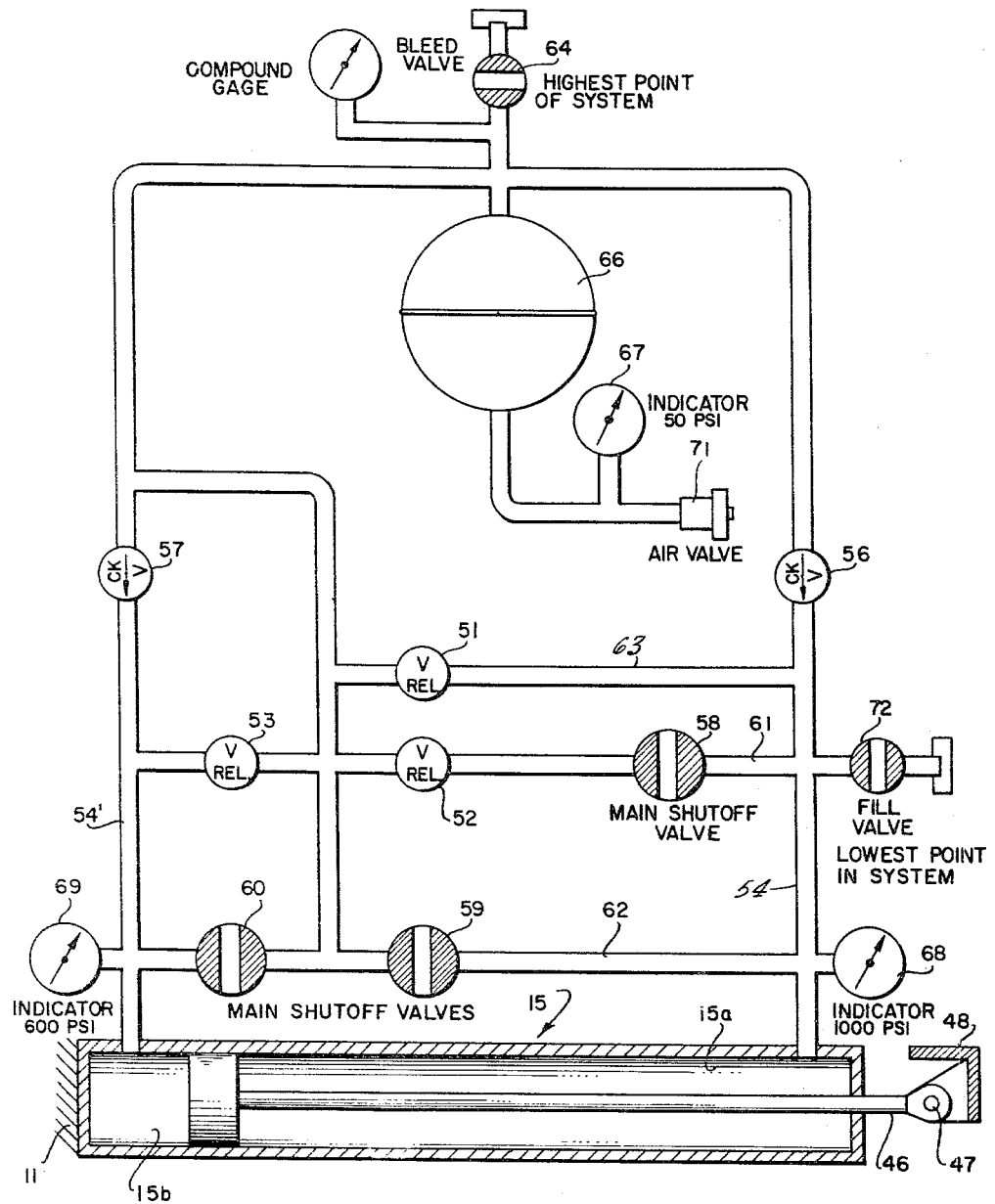

In the drawings:
FIGURE 1 is a perspective view, in elevation, of the testing apparatus of this invention;
FIGURE 2 is an enlarged, fragmentary perspective view, illustrating a portion of the testing apparatus in greater detail;
FIGURE 3 is a fragmentary perspective view, in elevation, of another portion of the testing apparatus of this invention;
FIGURE 4 is a schematic view, illustrating an hydraulic system incorporated in the testing apparatus; and
FIGURE 5 is a perspective view, in elevation, of a modified embodiment of the testing apparatus of this invention.

Referring in detail to the drawings, and more particularly to FIGURES 1-4, inclusive, there is shown, by way of illustration, but not of limitation, a new and improved testing apparatus for testing ball screws and ball screw actuators, designed and constructed in accordance with this invention and generally designated by the numeral 10. As best seen in FIGURE 1, the testing apparatus 10 generally comprises a relatively rigid and sturdy frame 11; and a means 12 for mounting an actuator to be tested, generally designated by the numeral 13, on the frame so that its screw 14 is extendible and retractable; means, in the form of an hydraulic cylinder 15, for selectively or automatically subjecting the actuator to predetermined loads during extension and retraction thereof; means 16 for driving the actuator 13 to extend and retract its screw; and means for indicating the condition of the actuator to indicate the condition of the balls, the ball nut deflectors and the ball transfer tubes under different applied loads. The usual test actuator 13, illustrated as an example as mounted in the apparatus 10, is a ball screw actuator having a longitudinal telescopic screw 14 cooperable with an actuator gear box 17 and a pair of axially-spaced ball nuts 18 and 19, each having ball transfer tubes 20, for causing balls thereof to climb up within the ball deflectors thereof.

The frame 12 is preferably configured as substantially an A-frame, having its lower legs 21 pivotably secured as at 22 on a cross-bracket 23 of the frame 11 and its upper leg or end 24 having a bracket 25 to which one end of the actuator 13 is detachably securable. More specifically, the bracket 25 is adapted, by means or manually operable screws 26, to detachably secure a yoke 27 of the actuator so that the screw 13 may extend and retract in response to rotation of a transverse shaft 28 extending outwardly of the gear box 17 while the gear box 17 is detachably secured to a transverse bulkhead 29 fixed on the stationary frame 11. The gear box end 17 of the actuator may be conveniently and practically detachably secured to the bulkhead 29 by a plurality of clamp members 31, preferably of a type in which the gear box 17 may be easily, readily secured and detached from the bulkhead 29, and in which the gear shaft may be practically supported for rotation to operate the screw.

In this manner, when the gear shaft 28 (FIGURE 3) is rotated, as normally accomplished by a drive means within a wing flap, or the like, the screw 13 is caused to extend outwardly and retract inwardly to rock the frame 12 about its pivot point 22.

The drive means 16, preferably in the form of a D.C. motor 32, is mounted in a torque frame 33 so as to transmit its torque to the frame and provided with a pair of fore and aft bearings 34 to support the motor rotatably in the frame 33 and coupled by a coupling 34 to a gear box 36 to rotate the driven shaft 28 of the gear box 17 which, as previously mentioned, causes the screw 13 to extend and/or retract.

The drive means 16 and its frame 33 is preferably mounted on an extension 37 of frame 11 and the frame 33 is connected to a torque meter, generally designated by the numeral 40, for indicating the torque of the motor 32 so that the torque can be used as a factor in analyzing the condition indicated by the indicating means of the apparatus to be hereinafter described.

The torque meter 40 includes a bracket 41 secured to the torque frame 33 of the drive means 32 so as to move a torque bar 42. The torque bar 42, in turn, is coactive with fingers 43 secured to torque bars 44. When the drive motor 32 is actuated, the torque thereof is transmitted to the frame 33 which, in turn, is transmitted to the bending bars 44 and is also read directly by a dial 45 and mounted to stationary structure adjacent to the bracket 41. The fingers 43 are laterally adjustable relative to the bars 44 so as to adjust the torque meter to obtain deflections under different loads falling within the limitations of the torque indicator. The dial indicator 45 measures the deflection of frame 33 or connected structure as an indication of the motor torque so as to allow a check of the drive motor output before an actuator such as that shown at 13 is tested. This is relatively important inasmuch as extension and retraction times of the actuator 13 (or of actuator 13' of FIGURE 5) to be tested vary with the motor torque output. This indicator is, however, not meant to give a direct reading of the ball screw efficiency. To analyze the overall efficiency of the ball screw or ball screw actuators, times and measured for complete extension and retraction of its screw as will be hereinafter described.

A means is advantageously provided for subjecting the actuator 13 to predetermined loads during extension and retraction so as to test the actuator under conditions simulating actual use thereof. For his purpose, a modified aircraft-type hydraulic cylinder, or other, mounted to the frame 11 and A-frame 12 is used in combination with control valves, pressure relief valves, pressure indicators and an hydraulic accumulator. The load-application means, or hydraulic cylinder 15, preferably is modified by the addition of intake and exhaust ports to reduce back pressures. Low back pressures are preferable for starting checks under no load conditions.

The hydraulic system includes the cylinder 15 which forms a part of a completely closed, pressurized system. The closed system is used not only to exclude spilling of hydraulic fluid, but also to prevent air from leaking into the cylinder past a shaft seal thereof and to preclude cavitation of the cylinder.

The cylinder 15 includes a piston reciprocable therein and having a piston rod 46 pivotly secured at its outer end 47 to a cross-bar 48 of the A-frame 12 whereby the cylinder 15 is arranged substantially in parallelism with the screw 13 and the cylinder is pivotally secured at its opposite end 49 to the frame 10. Therefore, as the screw 13 is extended from its gear box 17, the piston rod 46 is moved therewith to be extended from the cylinder 15 and when the screw 13 is retracted, the piston rod 46 is also retracted within the cylinder 15.

As it can now be more clearly understood, from the foregoing description, as the piston rod 46 is being extended by the action of and in parallelism relative to the screw 13, and a load is applied in the cylinder 15 tending to retract or resist extension of the piston rod, the load is directed to resist the extension of the screw 13. Similarly, when the screw 13 is retracted by the drive means 16, and a load is applied in the cylinder 13 contrary to the direction of travel of the screw 13, the resulting resistance to screw retraction places a load on the screw 13 simulating that of a load to which the screw is normally subjected during its operational retraction.

As best seen in FIGURE 4, the hydraulic system provides convenient means for placing a preselected load on the cylinder 15. The hydraulic system therein illustrated includes a plurality of relief valves 51, 52 and 53 selectively interrupting the flow of the system, and placing load on the cylinder in the following manner:

Flow from one side 15a of the cylinder is directed through hydraulic conduits 54 and 54' to the other end 15b of the cylinder and is controlled by check valves 56 and 57. Main shut-off valves, indicated at 58, 59 and 60, are further provided in the hydraulic system to control flow through conduits 61 and 62 communicating between the conduits 54 and 54'. Therefore, when the valves 58 and 59 are closed, hydraulic fluid passes through the conduit 54 into a transverse conduit 63, through the relief valve 51, and ultimately through the conduit portion 54' to the end 15b of the cylinder. The valve 51 provides a resistance or back pressure of about 600 p.s.i. simulating the pressure normally subjected to the actuator 13 during a down flap or extension condition. This 600 p.s.i. is a maximum retract pressure. Pressure relief valve 52 provides extended pressure of 300 p.s.i. and the relief valve 53 is adjusted to provide a 175 p.s.i. retract pressure. The system is pressurized to the 175 p.s.i. when the valve 59 is opened and the valves 58 and 60 are closed, whereas the 300 p.s.i. condition is achieved when the valve 58 is opened and the valves 59 and 60 are closed.

A bleed valve 64 is provided at the highest point of the system for bleeding the system when and if necessary, and accumulator 66 is provided to store pressure. Additional indicators 67 and 68 and 69 each indicate the condition of the system at appropriate points with an air valve provided at 71. A fill valve, indicated at 72, is also provided which is at the lowest point of the system.

Suitable manually operable knobs (not shown) are preferably provided for controlling the valves 58 and 59 and 60 which direct the flow of hydraulic fluid to the relief valves 51, 52 or 53, respectively, these valves being preferably arranged on a control panel indicated at 75 in FIGURE 1.

An indicator, generally designated by the numeral 76, is conveniently positioned to indicate the times of retraction and extension and provides direct reading therefor. The timer 76, automatically operated by retract and extend switches, comprises means whereby the timer dial provides direct reading of the retraction and extension times. The switch stops are indicated by the numerals 77 and 78, in FIGURES 1 and 2. For this purpose, the switch stops 77 and 78 are advantageously mounted on an adapter board 79 and appropriately spaced relative to the arm 12 to be engaged by the micro, or other, switch, indicated by numeral 80 in FIGURE 5, and which is common to both embodiments. The switch 80, when actuated by either the stop 77 or 78, causes the drive motor 32 to stop, and then reverse in the opposite direction whereby the arm 12 is caused by the action of screw 13 to pivot on its pivot points 22, the distance being sufficient to accommodate the full extension and retraction of the screw 13. A pause of 4 or 5 second is preferably incorporated in a separate control system controlled by the switch 80 when it contacts the stops 77 and 78 so as to allow hydraulic fluid within the system to slow or stop its flow before initiating movement in the opposite direction, thereby decreasing turbulence in the hydraulic lines and overcoming the inertia of the fluid. The microswitch 80 controls an appropriate and fully conventional electric control system, incorporated with this invention for stopping, starting, reversing and delaying reversal and which is not considered a part of this invention, per se, and is therefore not more fully described herein.

To initiate operation of the apparatus (assuming the ball screw test sample 13 to be installed in the manner described), a switch (not shown) is provided on the control panel 75. Switch actuation initiates torque of the drive means 16, the torque being transmitted by the coupling 35 and its shaft and through the gear box 36 to the shaft 28 and gear box 17 to cause extension of the screw 13 of the actuator. When the actuator 13 is fully extended, the micro-switch 80 contacts and is actuated by the switch-engaging stop element 78 whereupon operation of the drive means 16 is halted and appropriate switches and circuits are energized to reverse the motor 16 after an appropriate delay. The actuator screw 13 is then retracted. Similarly, at the end of the retraction travel of the screw 13, the switch-engaging stop element 77 is contacted by the micro-switch 80 to halt the retraction of the screw 13 and the pivotal movement of the arm 12. In this manner, bottoming of the screw at either of its extremities is prevented and due to the time delay between extension and retraction and between retraction and extension, the hydraulic fluid within the system being allowed to come to rest preliminary to each sequential operational phase.

The torque measuring device 40 measures the torque applied by the frame 33 of the drive means. To further check the torque of the drive means 16 by conventional means, the gear box 36 is preferably provided with a shaft 82 extending from the gear box and connected to provide the same output as supplied to the drive shaft 28 of the actuator. A pulley, illustrated by the broken line 82' in FIGURE 3, is secured to rotate with the shaft 82 and a cord 83 is wrapped partially around the pulley.

The cord 83 is secured at one of its end to a measuring device, preferably in the form of a reader, such as a spring scale indicated at 84 whereby the output torque of the motor 32 is checked during its clockwise rotation.

The other end is held by the operator. The spring meter 84 is preferably used only during the initial test and eliminated after the reading is made by the dial indicator 40 in response to torque transmitted to the bend bar 42. In other words, initially, the operator may pull on the cord 83 until the r.p.m. of the drive shaft reads 325 r.p.m., simultaneously reading the torque pull on the spring scale 84. The full force should be at least 13 pounds. For subsequent tests, the dial indicator reading can be used without the need of a spring scale. The necessary friction can then be obtained by securing one end of the cord and, while holding the other end of the cord, regulating the dial indicator readings by pulling the cord.

The stops 77 and 78 may be easily regulated (or replaced) and easily and readily adjusted so as to provide the appropriate timing of actuation of the actuator to extend and retract the screw 13 to its full travel. In the event that it is desired to substitute an actuator of a different type, such as one indicated by the numeral 13' in FIGURE 5, the adapter plate 79 may be removed and replaced with one having stop blocks 77 and 78 accurately adjusted to correspond the movement of the frame 12 to the new actuator. Optionally, the plate 79 may be provided with means (not shown) for adjusting the stops 77 and 78 relative to the plate 79 without removal thereof if desired. The embodiment of FIGURE 5 further shows modified clamping means 25' and 31' for pivotally mounting opposite ends of the new actuator 13' frames 12 and 11, respectively.

In addition to the accurate measuring of the timing of the extension and retraction of the screw on the load, further testing can be made by the operator during the test. The multiscope, similar to the stethoscope used by doctors, can be used to listen to the balls climbing up the drive nut deflectors and into the ball transfer tubes under the different applied load. The multiscope is not a part of this invention, per se, and, being well known, is not shown or further described herein. Smooth operation of the ball nut is very important and a good listening device and amplifier is advantageous in analyzing the assembly of the ball screw after assembly, repair or overhaul. Testing can be stopped immediately and the ball screw removed for inspection before important damage takes place to the unit. An important advantage of this testing apparatus is that both the actuator and the hydraulic load cylinder are hinged at each end so that no bending loads are induced and the friction is kept to a minimum.

While the instant invention has been shown and described herein and what is conceived to be the most practical and preferred embodiments, it is recognized that departures may be made therefrom within the scope of the invention which is therefore not to be limited to the details disclosed here and is to be accorded the full scope of the claims.

What is claimed as new and desired to secured by Letters Patent is:

I claim:

1. A testing apparatus for ball screws and ball screw actuators and including a ball screw and a ball nut, and the like, comprising:
   (a) a frame;
   (b) means for detachably mounting the ball screw actuator on said frame so that its screw is extendable and retractable relative to the ball nut;
   (c) means for driving said actuator to extend and retract its screw;
   (d) means for subjecting the actuator to predetermined loads during extension and retraction thereof; and
   (e) means for indicating the time required to extend and retract the ball screw actuator relative to the ball nut while under said loads so as to indicate any faulty condition of the actuator.

2. A testing apparatus as defined in claim 1, wherein said drive means transmits a torque to said actuator so as to drive the screw of said actuators to extend or retract; and
  (a) means for predetermining the torque of said drive means under said load so as to be determined as a factor in the indication of the condition of the actuator.

3. A testing apparatus as defined in claim 1, wherein said mounting means includes arm means pivotally secured at one of its ends on said frame and adapted to have one end of the actuator secured to its opposite end; and
  (a) wherein said means for applying a load to said actuator includes an hydraulically operable cylinder secured at one of its ends to said arm and intermediate its outer ends and to said frame in parallelism to the actuator.

4. A testing apparatus as defined in claim 3, wherein said cylinder is pivotally secured to said frame and arm, respectively, whereby bending loads and friction loads at points of mounting to said frame and arm are kept to a minimum.

5. A testing apparatus as defined in claim 2, wherein said torque-measuring means comprises a bending bar mounted to deflect in response to torque produced by said drive means, and
  (a) indicator means for indicating the amount of deflection of said bar so as to indicate the amount of torque produced by said drive means.

6. A testing apparatus as defined in claim 1, including control means for controlling the operations of said drive means to extend and retract a screw of various ball screw actuators.

7. A testing apparatus for a ball screw actuator, comprising:
  (a) a first frame;
  (b) a second frame pivotally mounted on said first frame for reciprocal pivotal movement relative to said first frame;
  (c) means for mounting an actuator with one of its ends pivotally mounted on said first frame and its opposite end pivotally mounted on said second frame so the screw of the actuator is extendible and retractable in response to a reciprocal pivotal movement of said second frame relative to said first frame;
  (d) a fluid operated cylinder mounted on said frame and in parallelism of its axis to the axis of the actuator and having an outer end of its piston rod secured to said second frame so as to retract its piston in said cylinder in response to retraction of the screw of the actuator and extend said piston rod to extend its piston relative to said cylinder in response to extension of the screw of the actuator;
  (e) said cylinder being adapted to flow fluid from one side of its piston to the other in response to said extension and retraction;
  (f) means for regulating the flow of the fluid so as to subject said second frame to preselected loads when pivotally reciprocated by said screw;
  (g) means for driving the actuator to extend and retract its screw whereby said second frame is subjected to said loads during pivotal movement of second frame; and
  (h) means for indicating the time of extension and retraction of the screw of the actuator while under said loads and so as to be comparable to normal time intervals required to normally extend and retract the screw under like loads when in acceptable operative condition so as to indicate any faulty condition in the actuator.

8. A testing apparatus as defined in claim 7, wherein said drive means is reversible responsive to positioning of said second frame in extremities of its reciprocal movement to reverse said driving means thereof.

9. A testing apparatus as defined in claim 8, wherein said drive means is switch operated and includes switch means on said second frame and switch operating means on said first frame including a pair of spaced switch actuators engageable by a switch at a predetermined extent of the pivotal movement of said second frame so as to predetermine the travel of said second frame for extension and retraction of the screw of the actuator.

10. A testing apparatus as defined in claim 1, and further characterized by means for measuring the torque differential of said drive means when said actuator is subjected to said loads so as to be a factor in indicating the condition of the actuator, said means including means for mounting said drive means motor in a frame rotatable in response to the torque of the drive means.

11. A method for testing a ball screw actuator comprising:
  (a) mounting of the ball screw actuator so that its screw is extendible and retractable;
  (b) driving said actuator so as to extend and retract its screws;
  (c) placing an external predetermined load on said screw during its extension and retraction; and
  (d) measuring the time of extension and retraction while under the load so as to compare the corresponding time intervals of extension and retraction of the actuator when in acceptable condition so as to determine any faulty condition of component parts of the actuator.

12. A method as defined in claim 11, characterized by the step of applying an amplifier instrument to amplify sounds produced by selective component parts of the actuator while operated under said loads so as to determine any faulty condition of the component parts.

13. A method as defined in claim 11, including the step of mounting the actuator so that no bending loads are indicated and friction loads are kept to a minimum.

14. A method defined in claim 13, including the step of determining the torque output of drive means therefor during driving of said actuators so as to calculate the torque output as a factor in evaluating the time of the extension and retraction of the screw during said loading step.

References Cited by the Examiner

UNITED STATES PATENTS 3,041,867  7/1962  Knudsen _____ 73—9
3,060,719  10/1962  Pearlman _____ 73—7

OTHER REFERENCES

Roton Products Catalog, Roton Products, Division of the Anderson Company, Gary 40, Indiana, Aug. 1, 1958; Photograph showing "Variable Load Test," Section VII.

RICHARD C. QUEISSER, *Primary Examiner.*

JOSEPH P. STRIZAK, *Examiner.*